(No Model.) 2 Sheets—Sheet 1.
E. B. MEATYARD.
MANUFACTURE OF CAR WHEELS.
No. 310,701. Patented Jan. 13, 1885.
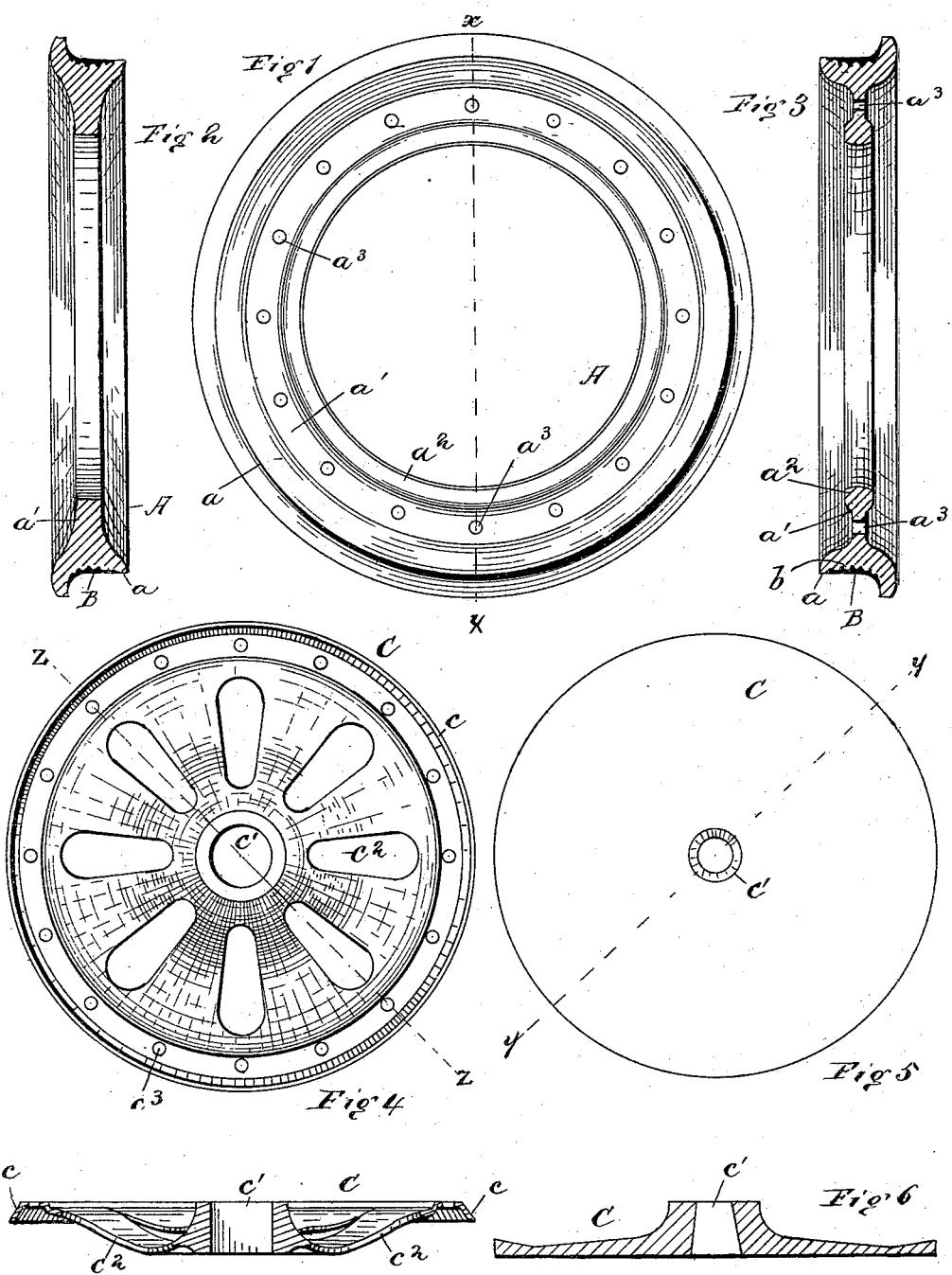
Witnesses
W. C. Coulies
A. M. Best
Inventor
Edward B. Meatyard
By Coburn & Thacher
Attorneys

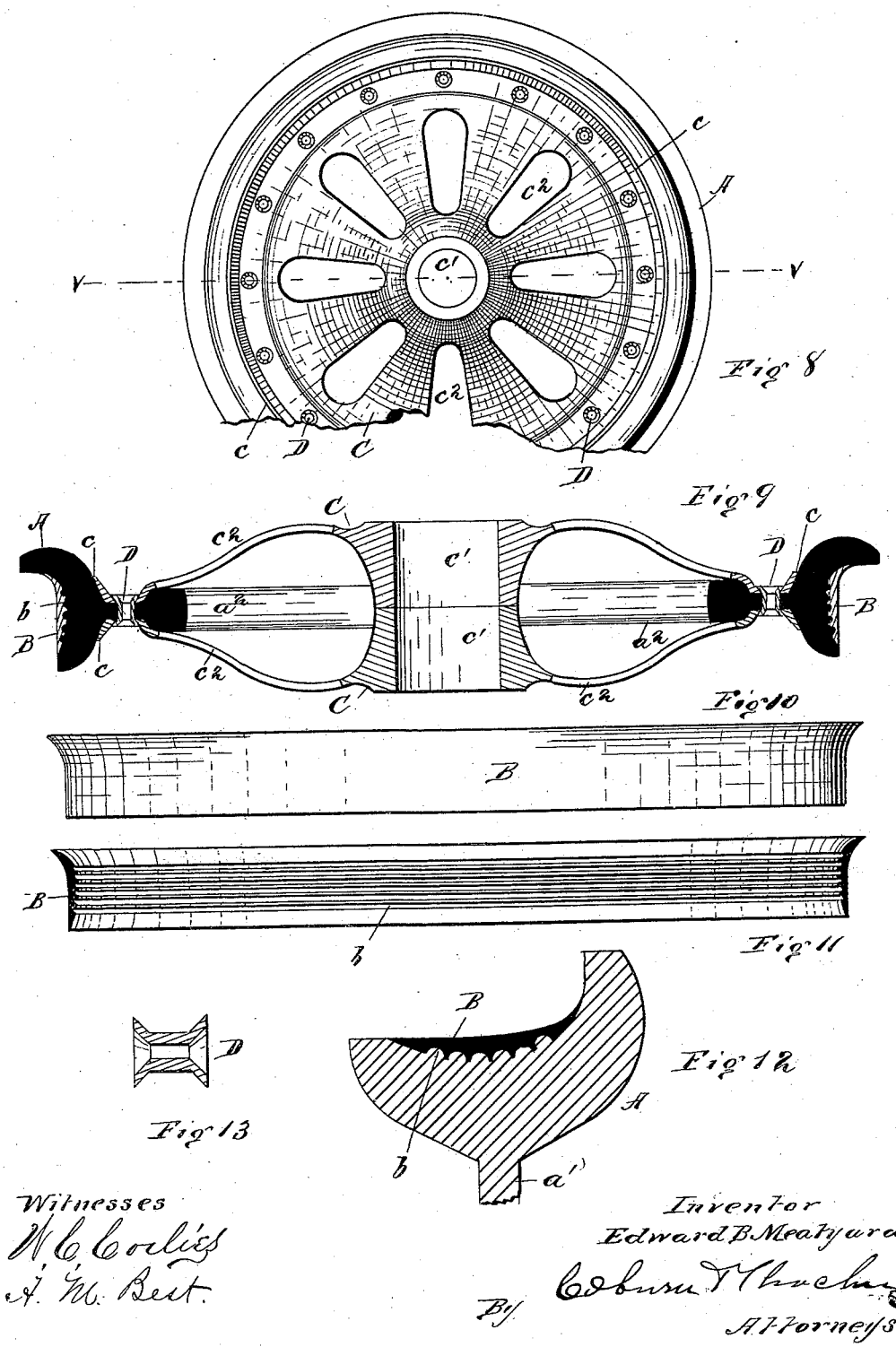

UNITED STATES PATENT OFFICE.

EDWARD B. MEATYARD, OF LAKE GENEVA, WISCONSIN.

MANUFACTURE OF CAR-WHEELS.

SPECIFICATION forming part of Letters Patent No. 310,701, dated January 13, 1885.

Application filed January 14, 1884. (No model.)

*To all whom it may concern:*

Be it known that I, EDWARD B. MEATYARD, a citizen of the United States, and residing at Lake Geneva, in the county of Walworth and State of Wisconsin, have invented a certain new and useful Improvement in the Manufacture of Car-Wheels, which is fully set forth in the following specification, reference being had to the accompanying drawings, in which—

Figure 1 represents an elevation of a completed car-wheel tire made under my process; Fig. 2, a cross-section thereof after the first step of pressing is completed; Fig. 3, a similar section of the same after the completed tire is taken from the hammer, the section being taken on the line $xx$, Fig. 1; Fig. 4, an elevation of one of the completed disks of the wheel made by my process; Fig. 5, a similar view of the disk after the first step of pressing is performed; Fig. 6, a cross-section of the same, taken on the line $yy$, Fig. 5; Fig. 7, a similar view of the completed disk after it leaves the hammer and punch, taken on the line $zz$, Fig. 4; Fig. 8, an elevation of the completed wheel ready for use, a portion being broken away; Fig. 9, a cross-section of the same, taken on an enlarged scale on the line $vv$, Fig. 8; Fig. 10, an edge elevation of the tire-band on the same enlarged scale; Fig. 11, a cross-section of the same on the same scale; Fig. 12, a cross-section of the tire and tire-band on a still more enlarged scale, and Fig. 13 a longitudinal section of the tubular rivet used to fasten the disks and tire together on the same scale as Fig. 12.

My invention relates to the manufacture of elastic car-wheels in which the tire is inflexible and the body of the wheel is composed of dense, homogeneous disks bent and perforated substantially like those described and shown in my Patent No. 260,593, dated July 4, 1882.

The present invention relates to a method of making the tire and disks, the object being to produce a wheel of the description named above which will be strong, elastic, and at the same time durable, and which by this process may be manufactured with simplicity, rapidity, and economy of production.

I will proceed to describe in detail my improved method for the manufacture of elastic car-wheels, and will then point out in the claims the special improvements which I believe to be new and wish to protect by Letters Patent.

I will first briefly describe the construction and arrangement of the different parts which I consider best adapted to make a desirable wheel. The tire A is of cast-steel, and when finished has a suitable tread, $a$. On the inside is a projecting flange or annular web, $a'$, the inner edge of which is enlarged or thickened, as shown at $a^2$ in the drawings. Rivet-holes, $a^3$, are made through the thinner portion of this annular web. I prefer to provide this tire with a band, B, of harder metal, running around the tread, and of such shape as to conform thereto. This band is provided with annular grooves, $b$, on the inside thereof, and, as the tire is cast into it, the metal thereof will be forced into these grooves under the process of manufacture which will be described presently. The body of the wheel is composed of two steel disks, C, which are cast and shaped into a form substantially like that shown in my prior patent, No. 260,593. The outer edges, $c$, of these disks are shaped, however, to exactly fit the annular web of the tire and abut against the inside of the tire, as shown in Fig. 9 of the drawings. The disks are made with central hubs, $c'$, which are perforated to receive the axle, and the thin elastic body of the disks is also provided with perforations or openings $c^2$, while at their outer edges are rivet-holes $c^3$. The hubs of the disks are arranged almost entirely on one side thereof, and in setting up the wheel or putting the parts together to make a wheel two disks are used, with their respective hubs arranged on the inside of the disks opposite to and abutting against each other, as shown in Fig. 9 of the drawings. The disks are secured to the tire by means of rivets D, which are preferably of tubular form, as shown in Fig. 13 of the drawings, for this form of rivet makes a very strong fastening, and is more reliable than where rivets with large heads are used, which are very apt to produce various degrees of imperfection due to upsetting. The rivets may be countersunk in the edges of the opposite disks, their hollow ends being extended to fill the countersinks in the disks.

I will now proceed to describe the process by which I make the tire and body for these wheels. I may say, in general, at the outset, that the process consists in first casting these parts under pressure and then finishing them in a steam die-hammer; but in order to obtain a dense, homogeneous metal I desire to obtain a high degree of pressure with equal action, so that the gases and impurities may be effectually squeezed out of the metal while in the molds and hot enough to part with its impurities, and the walls of the gas-cells completely welded under the great force exerted.

I am aware that it is common to cast metal under pressure, and that steel is cast under pressure; but I am also aware, from repeated and expensive experiment, that it is out of the question with ordinary hydraulic pressure, or with any of the ordinary means for producing pressure in casting, to obtain any high degree of pressure on large areas without very expensive machinery.

In the progress of my efforts to improve the manufacture of car-wheels, so as to produce a satisfactory wheel and at the same time so cheap as to make it practical commercially, I have been compelled to invent machinery for the first operation of casting, whereby I am enabled to multiply the power of a quick-acting motor in increasing ratio to obtain with promptness a great degree of pressure directly upon the area of the metal in the molds. This mechanism is the subject of Letters Patent No. 290,448, granted to me December 18, 1883.

After the parts are cast in form approaching that of the completed article they are to be further formed and finished in a steam die-hammer; but I have also found by experience that it is not safe to forge these parts to set and size in the dies of an ordinary hammer, because the parts are of such a nature that they cannot be turned over during the operation, and so will be finished unequally and differently on opposite sides, whereas it is of the utmost importance that the tires, and especially the disks, shall be finished so as to have substantially the same surface on both sides, or, in other words, the metal on both surfaces of the parts should have the same degree of hardness and elasticity; otherwise the wheels will soon break in practical use. In order to accomplish this desired result, I have invented a steam-hammer provided with two balanced movable rams, which is the subject of Letters Patent No. 290,449, granted to me December 18, 1883. By the use of this hammer with double-acting rams the tires and disks are treated in substantially the same manner on both sides in the dies, and so receive substantially the same finish, so that both surfaces will have substantially the same characteristics.

I will now proceed to state somewhat more in detail the method set forth in general terms above. The tire-band is first made of hard steel by press and roll, and is placed in the molds in which the tires are to be cast. The molten metal is then let into the molds, which are submitted to great pressure under the action of a press like that described in my Patent No. 290,448, by which all gases and impurities are squeezed out of the metal while at welding-heat, and a tire is cast of dense, homogeneous steel, with an outside band of hard steel, which is held to the main body by the metal of the latter forced outward into the annular grooves on the inside of the band. The tire is not perfectly shaped in the molds. It is of the form shown in Fig. 2 of the drawings, in which it will be seen that the web and inside of the tread are not in the finished form of the completed tire already described. While the metal is still hot the tire is taken from the molds of the press and placed in the dies of a hammer like that described in my Patent No. 290,449, these dies being of a shape conforming to that of the completed tire. The hammer is then put in operation, and under successive blows increasing in force the tire is formed in the dies into the required shape and finished on both sides substantially the same, the operation of the hammer producing a series of modulated blows in rapid succession on both sides of the forging simultaneously. The finished tire coming from the dies of the hammer will have the form shown in Figs. 1 and 3 of the drawings. The disks C, which form the body of the wheel, are made in the same way. First, they are cast in the molds of the press in a form approximating the finished state, which is shown in Figs. 5 and 6 of the drawings. It will be noticed in Fig. 6 of the drawings that the edge of this casting is thickened considerably. This is done to retain the heat in the metal as much as possible, and to insure a perfect welding while the metal is still at welding-heat. These cast disks are removed from the molds to the dies of the hammer, which are shaped like the finished form of the disks, and the hammer is operated as described above, by which the cast disk is forged to the required size and set under the successive blows given to each side of the disk lying in the dies. The disk, when removed from the dies, will have the form shown in Figs. 4 and 7 of the drawings, but without perforations, and having both surfaces substantially the same in finish, hardness, and elasticity. These disks are then passed to a multiplex tool, operated substantially as the ingot-press referred to above, in which the slots between the spokes are cut out and trimmed, and at the same time the rivet-holes are punched. Before this is done some of the heat may be taken out in a bath of linseed-oil, the object, however, being to protect the disks from the corrosive action of the atmosphere, and to keep them from warping or buckling, rather than to temper them. The rivet-holes are bored in the tires in a similar machine, and the several parts of the wheel are then ready to be put together whenever necessary. The disks and tire are put together and secured by rivets, as already described.

I am aware several attempts have been made to manufacture satisfactory wheels from wrought metal, but, so far as I know, with indifferent success. If the steel has been made hard and elastic, it has been brittle, and the wheels were therefore very liable to fracture; and if made sufficiently soft to obviate this difficulty, the wheels have not been durable, because wearing away rapidly in use. At the same time finishing by hammering on one side only has resulted in producing different surfaces on the metal forgings, which has also increased the liability to fracture and impaired the durability of the wheels. I believe that I have overcome all of these difficulties, and am able to produce a wheel with a hard dense metal tire and a tough highly-elastic body which will stand the severe wear to which these wheels are subjected, which is not liable to fracture, which will last a long time, and which can be produced with comparative ease and cheapness.

I am aware that wheels have been made with a steel tire-band forced on the body; but this operation excites the elasticity of the tire to a high degree. A center or body three inches thick, which requires four hundred and fifty (450) tons pressure to force it into a tire having an internal diameter of thirty-six inches, will produce a bursting strain of nearly eight tons per square inch, which will equal over twenty thousand (20,000) pounds of tensile strain per square inch of section in a rim or band of three inches thick and five and one-half inches wide. Obviously the wearing value in this wheel is greatly impaired.

In my process I do not excite the elasticity of any part of the wheel during the process of manufacture; but I aim to save all the elasticity of the metal, so that it may be utilized for actual service and make the wheel capable of enduring greater strain than under the circumstances mentioned above.

I do not wish to be understood as limiting myself in the operation of my process to presses and hammers entirely like those described in my prior patents referred to above, for of course those machine-tools may be changed in construction; but I do mean to say that in carrying out my process presses and hammers must be employed having substantially the same operation and producing substantially the same results as those described in the patents referred to, and as herein set forth. Furthermore, I do not wish to be understood as limiting myself to a wheel having the parts of precisely the shape and arrangement which I have herein described and shown, for changes may be made in these particulars and yet my process utilized for the manufacture of the several parts of the wheel.

In describing the form and arrangement of the several parts of the wheel I have only aimed to show a construction which I believe is adapted to secure the best results, but without intending to limit my process to the production of this particular wheel only.

Having thus described my invention, what I claim as new, and desire to secure by Letters Patent, is—

1. The herein-described process employed in the manufacture of elastic-metal car-wheels, the same consisting in first casting the tire and body disks under great pressure, and then finishing the same severally while hot in dies in which blows of a hammer of equal force are given simultaneously to both sides of the castings, substantially as and for the purposes set forth.

2. The herein-described process of casting metal wheel-tires with a band of steel, the same consisting in first casting the band under great pressure, then rolling it to size with annular flutes or grooves on its inside surface, then casting soft steel under great pressure upon the inside of this band in a suitable mold, and then finally finishing the same in a die-hammer in which blows of equal force are given simultaneously to both sides of the castings, substantially as and for the purposes set forth.

3. The herein-described process for the manufacture of metallic car-wheels, the same consisting in first casting the tire and body disks severally under great pressure in the molds of a mechanical press, and then in the same heat finishing them in the dies of a hammer in which blows of equal force are given simultaneously to both sides of the castings, and then riveting the disks and tire together, substantially as and for the purposes set forth.

EDWARD B. MEATYARD.

Witnesses:
JNO. C. MACGREGOR,
A. M. BEST.